(12) United States Patent
Ward

(10) Patent No.: US 9,104,762 B1
(45) Date of Patent: Aug. 11, 2015

(54) UNIVERSAL DATABASE MANAGEMENT

(71) Applicant: Amazon Technologies, Inc., Reno, NV (US)

(72) Inventor: Miles Julian Ward, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 206 days.

(21) Appl. No.: 13/741,233

(22) Filed: Jan. 14, 2013

(51) Int. Cl.
*G06F 7/00* (2006.01)
*G06F 17/30* (2006.01)

(52) U.S. Cl.
CPC .... *G06F 17/30864* (2013.01); *G06F 17/30076* (2013.01)

(58) Field of Classification Search
CPC G06F 17/30; G06F 11/3086; G06F 17/30076
See application file for complete search history.

(56) References Cited

U.S. PATENT DOCUMENTS

| 8,762,887 | B2 * | 6/2014 | Jalon et al. | 715/838 |
| 2005/0146747 | A1 * | 7/2005 | Meisner et al. | 358/1.15 |
| 2008/0215667 | A1 * | 9/2008 | Rothbarth et al. | 709/202 |
| 2013/0111171 | A1 * | 5/2013 | Hirezaki et al. | 711/165 |
| 2013/0227047 | A1 * | 8/2013 | Dolce et al. | 709/213 |

* cited by examiner

*Primary Examiner* — Azam Cheema
(74) *Attorney, Agent, or Firm* — Lee & Hayes, PLLC

(57) ABSTRACT

Database messages, such as queries, may be managed to process data based at least in part on performance characteristics. For example, a database query associated with a first database format may be received. The first database format may be one of a plurality of database formats. A second database format may be determined based at least in part on a performance characteristic of the second database format being above a threshold. The second database format may be determined as a result of the received database query. Additionally, the second database format may also be one of the plurality of different database formats. Data communicated by the received database query may be processed according to the second database format.

23 Claims, 7 Drawing Sheets

UNIVERSAL DATABASE MANAGEMENT

BACKGROUND

Data storage and database management have become ubiquitous among software systems in recent years. In some cases, such systems may manage data of a customer, of an account, of a business, of an application, etc. Additionally, web services may provide database management solutions and/or the ability to access database engines or storage subsystems. However, over time, many different types of database management techniques have been designed and implemented, such that users of the database management systems may only understand or have access to a subset of all of the different database options. Additionally, different database operations may be more efficient using different database types. However, managing the different types of operations and/or management systems may pose problems for users and/or the services alike.

BRIEF DESCRIPTION OF THE DRAWINGS

Various embodiments in accordance with the present disclosure will be described with reference to the drawings, in which.

DETAILED DESCRIPTION

Figure 1:
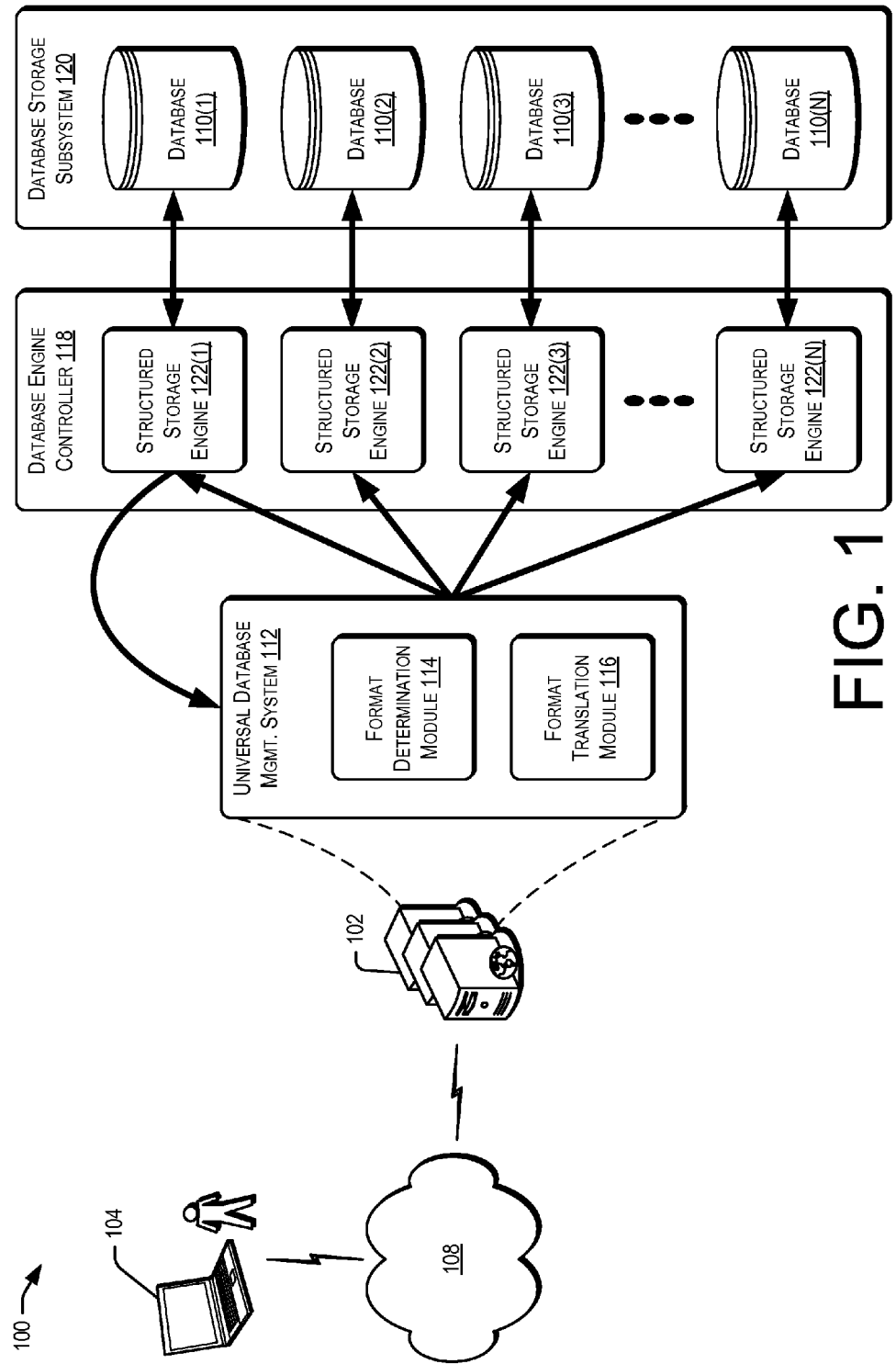
FIG. 1 illustrates an example architecture for implementing techniques for managing multiple database structures as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing techniques for managing data within multiple different database formats and/or structures of a service provider. This may include allowing network connections to answer database queries in any format from any database engine. In some examples, a database format may be based at least in part on a query language used for managing the data of a particular database type. For example, relational-type databases may manage data based at least in part on a physical or logical structure that is different than that of a hierarchical-type database. Other database types may include, but are not limited to, object databases, network databases, graph databases, structured query language (SQL) databases, document databases, other non-relational databases, or the like. Additionally, in some examples, a database format may be based at least in part on a particular arrangement, structure, and/or organization of the data in the database. For example, some database types may use data tuples, while others may not. Further, in some aspects, certain database types may be more efficient at certain tasks (i.e., data operations) than others. As such, using a single database for the storage of data may not always be beneficial.

In some examples, multiple database engines may be deployed by the service provider, where each database engine may be configured to store, manage, and/or process data corresponding to a respective storage subsystem. In some cases, each of the deployed database engines may each correspond to a different type of database. For example, a relational database engine may correspond to a relational database storage subsystem, a graph database engine may correspond to a graph database storage subsystem, etc. Additionally, in some cases, the physical storage device utilized to store the data associated with each storage subsystem may be separate components of a distributed computing system. As such, the storage devices may be located on different racks, in different datacenters, and/or in different cities, states, countries, etc. By way of example only, each database engine may control or otherwise perform operations on the data logically stored within the appropriate storage subsystems. In some cases, these operations may be performed based at least in part on database queries received from customers associated with the managed data.

Additionally, in some examples, a query language translation system may be configured to convert received queries (e.g., in a first format) into queries of other formats to be provided to the database engines. In this way, the service provider may be able to provide a many-to-many database management system that enables storage and/or management of data utilizing any or all of the multiple different database techniques regardless of the format of the incoming query (e.g., from the user). For example, the service provider may be configured to store a user's data in each and every possible database format (as used herein, "database format" and "database type" are used interchangeable). As such, the user may provide a query configured to store data in a first query language configured to utilize a first database type. However, the service provider may translate that query into each appropriate query language to may be expected by the corresponding database engines of the service provider. Additionally, when the user submits a second query (e.g., to retrieve the data), regardless of the query language used or the database-type intended by the user, the service provider may retrieve the data from any of the database structures (i.e., based at least in part on any of the database formats). Further, in some examples, the service provider may first determine which database format would be the most efficient for responding to the user query. This determination may be based at least in part on monitored database operation information, heuristic data collected from users or other sources, the original query language, the type of the query, and/or the type of the data. For example, if the query includes a "join" command, the service provider may determine to utilize a relational database for performing the operation. However, in some examples (and without limitation), if the query includes a "retrieve" command, it may be more efficient to utilize a document-based database storage structure.

Further, in some examples, the service provider may be able to make storage, management, and/or processing decision in real-time to maximize query response efficiency and/or resource usage efficiency. For example, if a user is consistently utilizing queries that are most efficient on only three of the possible database formats, the service provider may determine not to utilize all of the database format options, and restrict storage of this user's data to only a subset of the possible database types. Additionally, in a similar scenario, the service provider may configure the database types most commonly used by a user to work at full capacity or be capable of utilizing more processor resources (or the like) than the less used database types. Further, in some aspects, the service provider may be configured to provide recommendations for types of queries that may be more efficient and/or types of database structures that may add value to a user or efficiency to management of the user's data. For example, a user may consistently store data in a relational database that would more appropriate (e.g., based at least in part on the determined heuristics, user information, operational information, etc.) for a non-relational database. In this example, the service provider may be configured to recommend to the user that he or she store that data in a non-relational database.

FIG. 1 depicts an illustrative architecture 100 in which techniques for providing universal database management as discussed herein may be implemented. These techniques are described in more detail below in connection with at least FIGS. 2-7. Returning to FIG. 1, the illustrative architecture 100 includes one or more service provider computers 102 accessible by one or more user devices 104 over one or more networks 108. Additionally, one or more computing resources (e.g., storage devices, processors, machine instances, etc.), in some examples, be managed by or otherwise implemented as part of the service provider computers 102. By way of example only, the service provider computers 102 may provide websites, web services, and/or distributed computing resources. In some examples, a web service of the service provider computers 102 may enable one or more network connections with the user device 104 for querying or otherwise managing user data in one or more databases.

In some examples, the networks 108 may include any one or a combination of many different types of networks, such as cable networks, the Internet, wireless networks, cellular networks, and other private and/or public networks. While the illustrated example represents the user devices 104 accessing the service provider computers 102 over the networks 108, the described techniques may equally apply in instances where the user devices 104 interact with the service provider computers 102 wirelessly, using fiber optics, or any other communication type, or in any other manner. It is also noted that the described techniques may apply in other client/server arrangements (e.g., set-top boxes, etc.), as well as in non-client/server arrangements (e.g., locally stored applications, etc.).

In some aspects, the service provider computers 102 may be any type of computing devices such as, but not limited to, mobile, desktop, thin-client, virtual, and/or cloud computing devices. In some examples, the service provider computers 102 may be in communication with the user devices 104 as noted above via the networks 108, or via other network connections. The service provider computers 102 may include one or more computing resources (e.g., processors and/or databases 110(1)-(N) (collectively, "databases 110")), perhaps arranged in a cluster, as a server farm, as individual servers not associated with one another, or not as servers at all (e.g., as virtual computing devices, datacenters, switches, or the like). Additionally, the service provider computers 102 may include (e.g., stored in memory and executable by one or more processors) a universal database management system 112 that at least includes a format determination module 114 and/or a format translation module 116. Additionally, the universal database management system 112 may be configured to manage or otherwise control a database engine controller 118 and/or a database storage subsystem 120. As used herein, modules may refer to programming modules executed by servers or clusters of servers that are part of a service (e.g., provided by the service provider computers 102). In this particular context, the modules may be executed by the servers or clusters of servers that are part of the universal database management system 112.

In some examples, the database engine controller 118 may be configured to manage one or more structured storage engines 122(1)-(N) (collectively, "storage engines 122"). Additionally, the database storage subsystem 120 may be a collection of different storage devices which make up the one or more databases 110. In some aspects, each of the storage engines 122 may be configured to receive database queries (e.g., in a particular language, format, etc.) and, at least as a result of receiving the queries, process the queries by managing (e.g., storing, deleting, joining, retrieving, etc.) data stored in each respective database 110. As shown in FIG. 1, each storage engine 122 may correspond to one particular database 110. However, in some examples one storage engine 122 may manage or otherwise control multiple different databases 110 or all of the databases 110 of the service provider computers 102.

Additionally, in some examples, the format translation module 116 may configured to convert a database query received from a user device 104 into a database query that will be understood by the storage engines 122. In some examples, no translation will be needed; however, as in the example when the received database query is in a format understood by the storage engine 122. However, when multiple storage engines 122 are to be utilized, one or more translations may be performed by the format translation module 116 prior to sending the database queries (e.g., from the user devices 104) to the individual storage engines 122. Additionally, in some examples, when data is being retrieved and/or an acknowledgement is being provided back to the universal database management system 112 from the database engine controller 118, the format translation module 116 may be configured to translate the data or the acknowledgement back to the format in which the original database query was received.

Further, in some examples, the format determination module 114 may be configured to determine appropriate database formats and/or storage structures for particular queries, packets, datum, and/or portions of data. In some aspects, the format determination module 114 may also be configured to make such a determination based at least in part on user information, the query and/or type of query, the data communicated by the query, performance information, or the like. For example, if a query is received from a user device 104 requesting a retrieval of a random set of data from a large data set, the format determination module 114 may determine that (of the many different database formats in which the data was stored) a document database type would be the most efficient type of database to retrieve the random pieces of data. As such, the universal database management system 112 may send the received query to the storage engine 122 corresponding to the determined database type (in this example, a document database).

In at least one non-limiting example, a user computing device 104 may provide one or more database queries over time that include instructions for storing a set of data with the service provider computers 102. Upon receipt of the data, in some examples for each data packet or discrete piece of data, the service provider computers 102 may provide the data to the universal database management system 112 for processing. In some aspects, the universal database management system 112 may have the data stored in every possible database type preemptively. In instances, when a query language translation is required, the format translation module 116 or another module may convert the received queries appropriately. Additionally, the universal database management system 112 may be configured with heuristics for determining which database types perform better under what circumstances. Further, in some aspects, the user computers 104 may also provide a database query utilizing a relational database query language that includes an instruction to retrieve at least one piece of data. Utilizing the collected heuristics, information about the data to be retrieved, information about the query (including the type and/or format), and/or other performance information, the format determination module 114 may then determine which database type, format, and/or structure may provide the data being requested in the most efficient manner. A query to the appropriate storage engine 122 (based at least in part on the determination) may then performed, such that the storage engine 122 may retrieve the data from the appropriate database 110. The data may then be provided to the universal database management system 112 and, subsequently, to the user computers 104.

Figure 2:
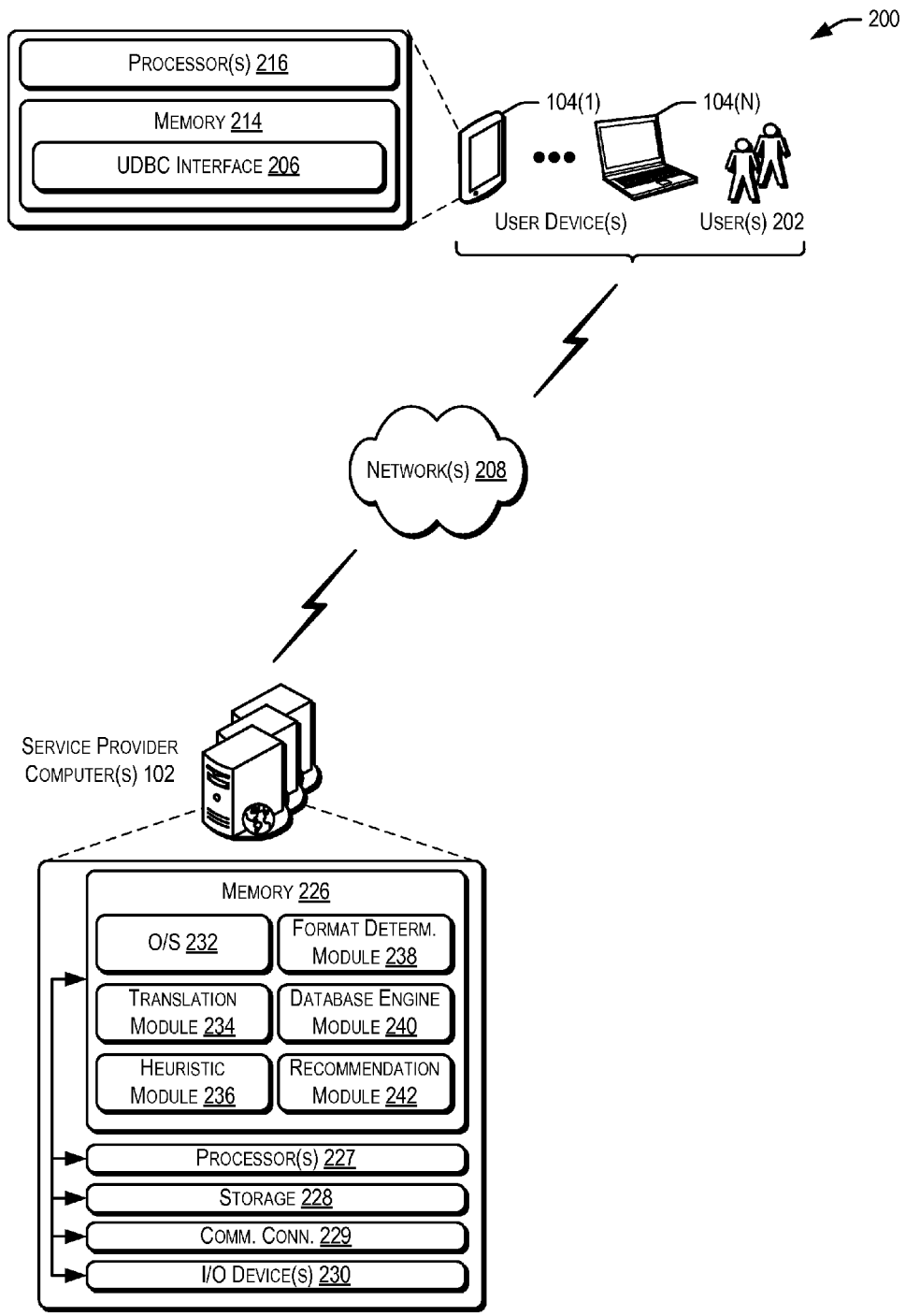
FIG. 2 illustrates another example architecture for implementing techniques for managing multiple database structures as described herein, according to at least one example.

FIG. 2 depicts an illustrative system or architecture 200 in which techniques for universal database management may be implemented. In architecture 200, one or more customers and/or users 202 may utilize user computing devices 104 as described with reference to FIG. 1 to access a universal database connection (UDBC) interface 206, or a user account accessible through the UDBC interface 206, via one or more networks 208. In some aspects, the UDBC interface 206 and/or user account may be hosted, managed, and/or otherwise provided by a computing resources service or service provider, such as by utilizing one or more service provider computers 102 as described with reference to FIG. 1. In some examples, a customer may utilize the UDBC to manage or otherwise store data in databases of the service provider computers 102. The one or more service provider computers 102 may, in some examples, provide computing resources such as, but not limited, web hosting, client entities, data storage, data access, data management, virtualization, etc. In some aspects, a processing entity may be virtual and/or data volumes may be stored virtually within a distributed computing system operated by the one or more service provider computers 102. The one or more service provider computers 102 may also be operable to provide web hosting, email hosting, online catalogs, product reviews, databases, combinations of the foregoing, or the like to the one or more users 202 via the one or more user devices 104.

In some examples, the networks 208 may include any one or a combination of many different types of networks, such as cable networks, the Internet, wireless networks, cellular networks, and other private and/or public networks. While the illustrated example represents the users 202 accessing the UDBC interface 206 over the networks 208, the described techniques may equally apply in instances where the users 202 interact with a service provider computer 102 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, mobile applications, etc.).

As described briefly above, the UDBC interface 206 may allow the users 202 to interact with a service provider computer 102, such as to store, access, and/or manage data of one or more databases, develop and/or deploy computer applications, host web content, and/or provide items for consumption or sale. The one or more service provider computers 102, perhaps arranged in a cluster of servers or as a server farm, may host the UDBC interface 206 (e.g., a GUI of a website via a web browser). Other server architectures may also be used to host the UDBC interface 206. The UDBC interface 206 may be capable of handling requests from many users 202 and serving, in response, various GUI elements that can be rendered at the user devices 104. The UDBC interface 206 can access and/or render any type of website that supports user interaction, including database interfaces, social networking sites, online retailers, informational sites, blog sites, search engine sites, news and entertainment sites, and so forth. As discussed above, the described techniques can similarly be implemented outside of the UDBC interface 206, such as with other applications (e.g., a web browser) running on the user devices 104.

As noted above, the architecture 200 may include one or more user devices 104. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 102 via the networks 208, or via other network connections.

In one illustrative configuration, the user devices 104 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of user device 104, the memory 214 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the UDBC interface 206. The UDBC interface 206 (e.g., when implemented by a web browser) may be configured to receive, store, and/or display a website or other interface for interacting with the service provider computers 102. The UDBC interface 206 may also be configured to provide one or more database query results, database management recommendations, or the like. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 104.

In some examples, the service provider computers 102 may also be any type of computing devices such as, but not limited to, mobile, desktop, thin-client, and/or cloud computing devices, such as servers. In some examples, the service provider computers 102 may be in communication with the user devices 104 and/or one or more other computers via the networks 208, or via other network connections. The service provider computers 102 may include one or more servers, perhaps arranged in a cluster, as a server farm, or as individual servers not associated with one another. These servers may be configured to host a website (or combination of websites) viewable via the user devices 104 or a web browser or other interface (e.g., the UDBC interface 206) accessible by a user 202. Additionally, in some aspects, the service provider computers 102 may be configured to manage one or more databases and/or the data stored in the databases.

In one illustrative configuration, the service provider computers 102 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of service provider computers 102, the memory 226 may be volatile (such as RAM) and/or non-volatile (such as ROM, flash memory, etc.). The service provider computers 102 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the service provider computers 102 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 102 may also contain communications connection(s) 229 that allow the service provider computers 102 to communicate with stored databases, another computing device or server, user terminals and/or other devices on the networks 208. The service provider computers 102 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232 and/or one or more application programs or services for implementing the features disclosed herein including a translation module 234, a heuristic module 236, a format determination module 238, a database engine module 240, and/or a recommendation module 242. In some examples, the translation module 234 may be configured to translate between multiple different database query languages and/or query messages similar to that of the format translation module 116 of FIG. 1. That is, the translation module 234 may manage or otherwise control the incoming and/or outgoing database queries such that database storage engines and/or user devices 104 receive queries in formats that are understandable and/or executable. For example, if the service provider computers 102 receive a query for data in a graph-type database, the translation module 234 may convert that query into a relational database query such that the relational database engine may be able to perform the query.

In some examples, the heuristic module 236 may be configured to generate, store, and/or manage heuristic information associated with query and/or database management performance. For example, some users 202 may opt-in or otherwise allow anonymous monitoring of their resources. Based at least in part on the resource monitoring heuristics may be built by the heuristics module 236 and stored within the service provider computers 102. Additionally, the heuristics module 236 may also observe performance characteristics of the user queries to help inform recommendations for users 202. For example, a heuristic may state, "if a query looks like x, use a y-type database structure for performing the query." Additionally, some heuristics may be built automatically and/or may indicate which queries are more efficient for what types of data and/or for what types of database structures (e.g., based at least in part on operational data). These heuristics may then be utilized by the format determination module 238. Additionally, in some aspects, the format determination module 238 of FIG. 2 may be configured as the format determination module 114 of FIG. 1. As such, the format determination module 238 may be configured to determine one or more appropriate database formats for storing data to and/or retrieving data from the multiple possible databases managed by the service provider computers 102.

In some examples, the database engine module 240, as described above with respect to the database engine controller 118 and/or the storage engines 122 of FIG. 1, may work in conjunction with one or more databases (potentially of different structures and/or utilizing different formats). As such, the database engine module 240 may be configured to perform database queries on corresponding databases. Further, in some examples, the recommendation module 242 may be configured to provide one or more recommendations to users 202 regarding which types of databases to utilize for which types of queries. For example, the recommendation module 242 may recommend that a user 202 making a query for relational information utilize a relational database for retrieving the requested information. Additionally, in some examples, the recommendation module 242 may be configured to provide recommendations regarding what types of queries to use for the requested type of data.

A few additional examples of the operations of the service provider computers 102 are also described in greater detail below with reference to FIGS. 3-7.

Figure 3:
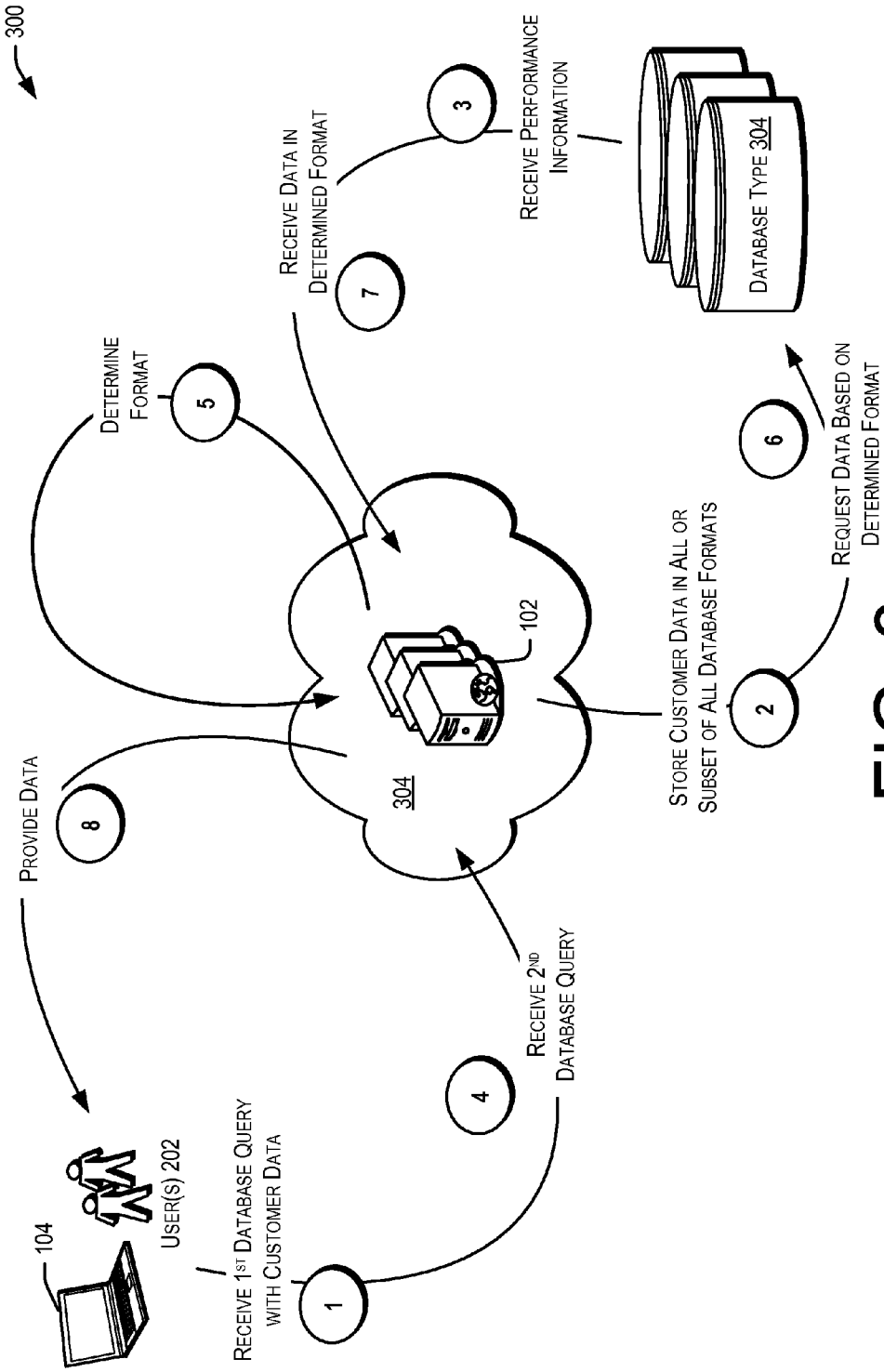
FIG. 3 illustrates yet another example architecture for implementing techniques for managing multiple database structures as described herein, according to at least one example.

FIG. 3 illustrates an example flow diagram showing one or more techniques 300 for universal database management, as described herein. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 102 described above with reference to FIGS. 1 and 2 may receive a first database query that includes customer data from a user computing device 104 via one or more networks 302 (e.g., a database query that instructs the service provider computers 102 to store data in a database 304 of the service provider computers 102). Based at least in part on the received database query, the service provider computers 102 may store the data in all of the available databases 304 (i.e., in each different type of database structure and/or in a single database using different database formats). However, in some examples, not all of the databases, types, and/or structures may be used; instead, the data may be stored in a subset of the database types that is less than all of the database types. Additionally, in some examples, the service provider computers 102 may also receive performance information associated with the storage the user data in the databases 304. For example, the performance information may indicate efficiency, speed, and/or network traffic issues.

In some aspects, the service provider computers 102 may also receive a second (or, at least subsequent) database query from the user devices 104. Based at least in part on several different pieces of information (e.g., the query type, a query format, a characteristic of the query, the data, etc.), the service provider computers 102 may also determine an appropriate format or database structure for carrying out the second query. In some examples, the service provider computers 102 may then request the data from the databases 304 or otherwise implement the second query based at least in part on the determined format. For example, if a hierarchical-type database is determined to be the most efficient choice for a particular query, the service provider may perform the query utilizing data stored in a hierarchical-type database as opposed to any of the other database types in which the data was stored. The service provider computers 102 may then receive the requested data from the appropriate database 304 and/or provide the data to the user devices 104.

Additionally, in some examples, output logging may be implemented such that certain information associated with the universal database management may be recorded and/or provided to users 202. For example, a class of metadata may come out of the different types of databases 304 and/or the operations performed in association therewith. For example, the metadata may describe what queries were called, how long it took to respond to each query, the times and/or dates of the queries, the types of database structures that were utilized by the service provider computers 102, etc. The metadata may also include the actual query and/or may have some information that may be useful as pre-formatting step for tuning the universal database management systems described herein. By way of example only, a customer may always request the same three queries. As such, in this non-limiting example, the service provider computers 102 may determine not to utilize all of the different database structures, not to deploy of the database formats, not to deploy all of the databases at full performance, and/or not deploying every database structure as quickly as the others. Further, some internal load balancing of database types may be utilized based at least in part on user history. For example, some database types may be configured to intentionally underperform when it is determined (e.g., from usage) that they are not regularly utilized.

Further, in some examples, a single database and/or single database storage system may be utilized. In this example, software modules may be utilized to figure out how to simulate each of the different types of database structures with the single database and/or single database storage system. In this way, the service provider computers 102 may not need to build or deploy each database types. Additionally, the service provider computers 102 may then store data in different types as additional requests that are similar are received and/or recognized.

Figure 4:
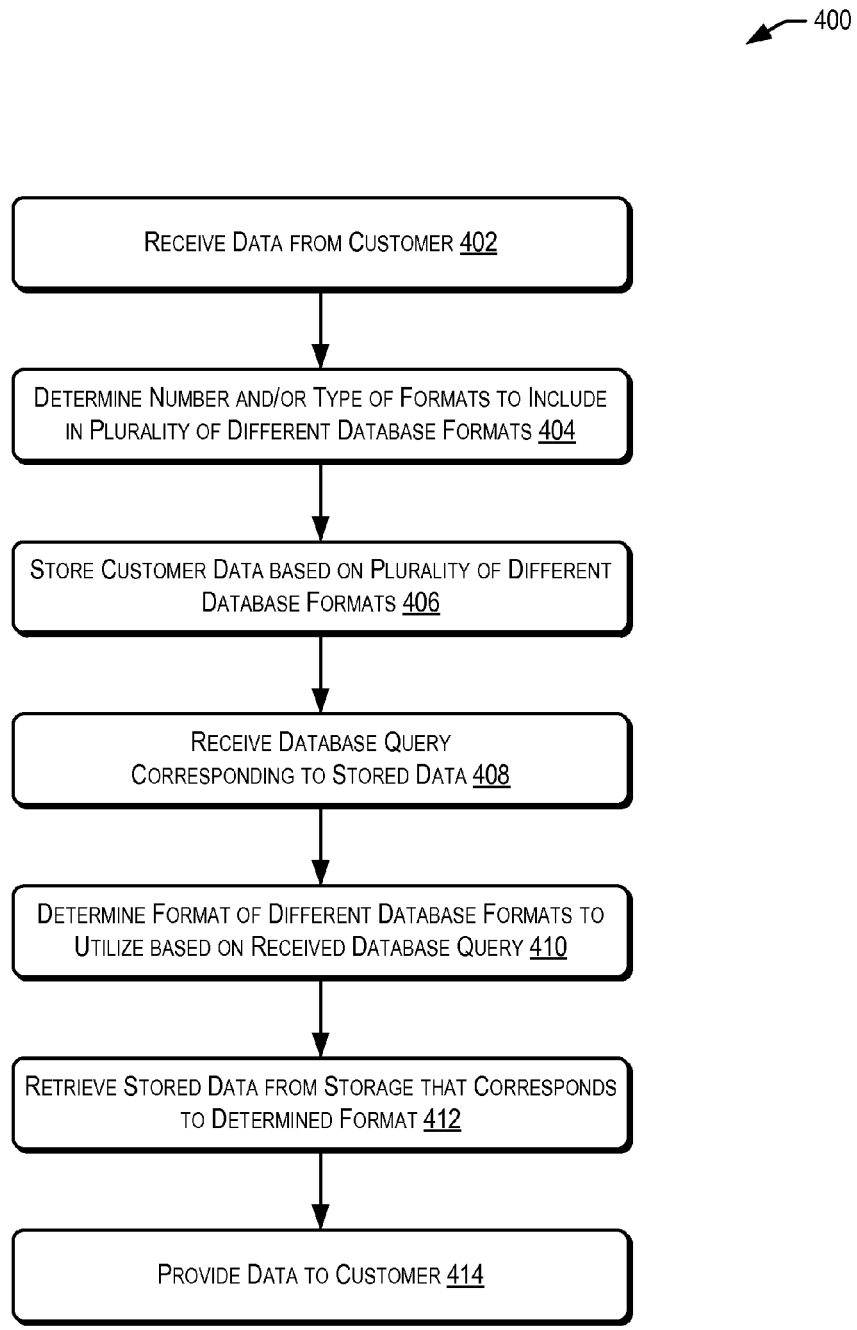
FIG. 4 illustrates an example flow diagram of a process for implementing techniques for managing multiple database structures as described herein, according to at least one example.
Figure 5:
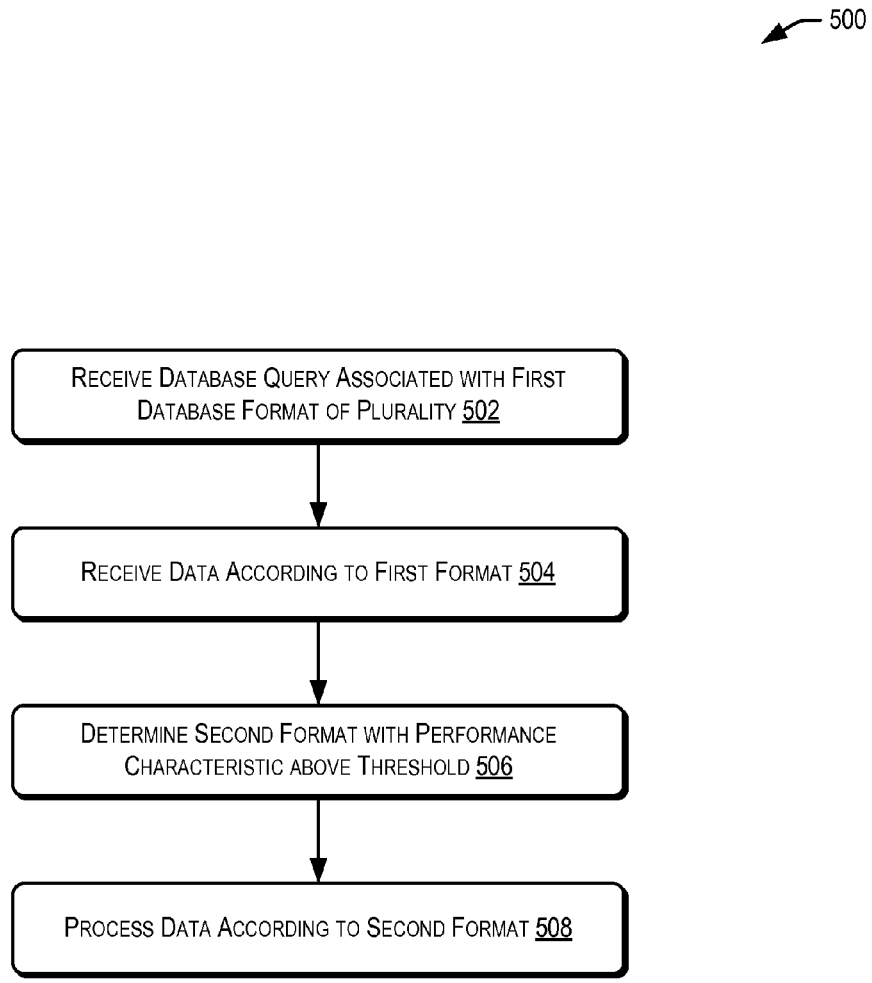
FIG. 5 illustrates another example flow diagram of a process for implementing techniques for managing multiple database structures as described herein, according to at least one example.
Figure 6:
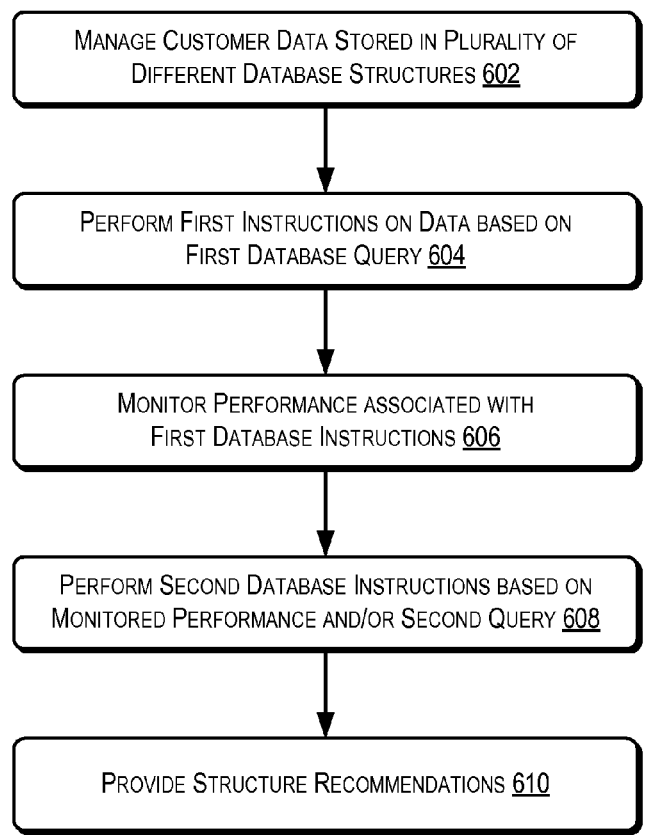
FIG. 6 illustrates another example flow diagram of a process for implementing techniques for managing multiple database structures as described herein, according to at least one example.

FIGS. 4-6 illustrate example flow diagrams showing respective processes 400-600 for implementing universal database management. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 102 (e.g., utilizing at least one of the format determination module 238 and/or the database engine module 240) shown in FIGS. 1 and 2 may perform the process 400 of FIG. 4. The process 400 may begin by including receipt of data from a customer at 402. The data may be received as part of a database query (e.g., a "POST" query, or the like) and/or as part of an instruction to set up a database utilizing the received data. At 404, the process 400 may include determining a number and/or type of format to include in a plurality of different database formats. For example, the process 400 may include determining, based at least in part on received queries, user and/or usage information, etc. to only utilize five different database formats. Alternatively, or in addition, the process 400 may include determining to only use certain types of database formats (e.g., excluding some other types). At 406, the process 400 may include storing the customer data based at least in part on the plurality of different database formats. In other words, the data may be stored in each of the different databases (e.g., preemptively). At 408, the process 400 may include receiving a database query (in some examples, a second or subsequent query) corresponding to the stored data. The process 400 may then include determining a format of the different database formats to utilize for performing the query at 410. For example, the format may be determined based at least in part on the received query, the data and/or information to be retrieved, or the like. In some examples, at 412, the process 400 may include retrieving the stored data from a storage device that corresponds to the determined format. For example, if the determined format is non-relational, the process 400 may include retrieving the data from a non-relational-type database at 412. Further, the process 400 may end at 414 by including providing the data to the customer.

FIG. 5 illustrates another example flow diagram showing process 500 for implementing universal database management. The one or more service provider computers 102 (e.g., utilizing at least one of the format determination module 238 and/or the database engine module 240) shown in FIGS. 1 and 2 may perform the process 500 of FIG. 5. The process 500 may begin by including receipt of a database query associated with a first database format of a plurality of database formats at 502. At 504, the process 500 may include receiving data according to a first format. For example, the data may be received a relational database query as opposed to some other format or type of query. At 506, the process 500 may include determining a second database format to utilize. In some examples, the second database format may a characteristic above a threshold. The characteristic may include speed of retrieval, efficiency of processing, actual cost of operating corresponding resources, etc. For example, utilizing a document database may be the fastest way to retrieve data for a particular query or a particular type of data; however, a graph database may utilize cheaper computing resources and, as such, may save the customer money. In some examples, the user may configure database management settings to indicate user preferences and/or priorities. For example, a user may wish to prioritize particular characteristics (e.g., cost savings, time savings, operation savings, overall efficiency, etc.), and have format decisions determined and/or format recommendations provided automatically based at least in part on the heuristics discussed above, actual user usage, and/or other information. At 508, the process 500 may end by including processing the data according to the second (i.e., the determined) format.

FIG. 6 illustrates an example flow diagram showing process 600 for implementing universal database management. The one or more service provider computers 102 (e.g., utilizing at least one of the format determination module 238 and/or the database engine module 240) shown in FIGS. 1 and 2 may perform the process 600 of FIG. 6. The process 600 may begin by including managing customer data stored in a plurality of different database structures. For example, customer data may be managed that is stored simultaneously in a relational database, a hierarchical database, a document database, and/or other non-relational databases. In some aspects, the process 600 may also include performing first instructions on the data based at least in part on a first database query at 604. The first database query may be received from a user and/or a user device. The first instructions may include, but are not limited to, post, get, join, etc. At 606, the process 600 may include monitoring performance associated with the first database instructions. For example, the first database instructions may be performed on a single piece of data over a multitude of different database structures. As such, performance information associated with the instructions being performed on each different structure may be monitored and/or collected. At 608, the process 600 may include performing second database instructions based at least in part on the monitored performance and/or based at least in part on the second query. At 610, the process 600 may end by including providing database format, type, and/or structure recommendations to the user. In some examples, the recommendations may also include computing resources to utilize, queries to make, query types to utilize, and/or query structure types to use in order to save time and/or costs associated managing the data.

Illustrative methods and systems for implementing dynamic network mirroring are described above. Some or all of these systems and methods may, but need not, be implemented at least partially by architectures and processes such as those shown at least in FIGS. 1-6 above.

Figure 7:
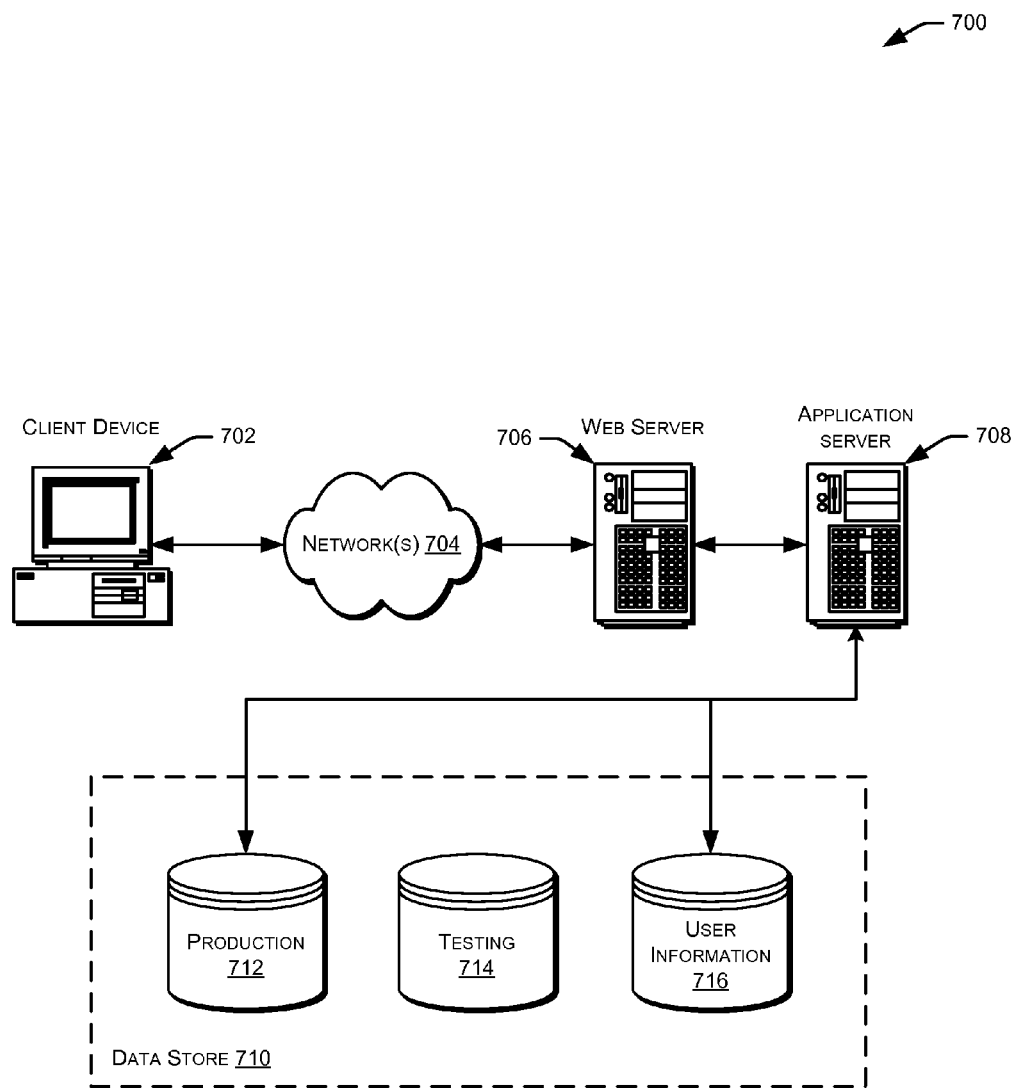
FIG. 7 illustrates an environment in which various embodiments of the techniques for managing multiple database structures as described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing database messages, comprising:
    under control of one or more computer systems configured with executable instructions, receiving data of a customer from a database management system;
    storing the data based at least in part on a plurality of different database formats, at least a subset of the different database formats corresponding to respective different database management characteristics;
    receiving a database query corresponding to the stored data;
    determining which database formats make up the plurality of different database formats based at least in part on database query usage information associated with the customer;
    determining, at least in response to the received database query, a format of the different database formats to utilize based at least in part on a type of the received database query, a retrieval efficiency of the determined format being above a threshold level, the determined format being based at least in part on the respective database management characteristic;
    retrieving the stored data from storage that corresponds to the determined format based at least in part on the determined format; and
    providing the data to the customer.

2. The computer-implemented method of claim 1, wherein the received database query is formatted in a database format different than the determined format.

3. The computer-implemented method of claim 1, further comprising determining how many database formats make up the plurality of different database formats based at least in part on database query usage information associated with the customer.

4. The computer-implemented method of claim 1, wherein the type indicates a function to be performed on the stored data.

5. A computer-implemented method for managing database messages, comprising:
    under control of one or more computer systems configured with executable instructions, receiving data of a customer;
    receiving a database query associated with a first database format of a plurality of different database formats, at least a subset of the plurality of different database formats corresponding to respective different database management patterns;

determining which database formats make up the plurality of different database formats based at least in part on database query usage information associated with the customer;

determining, at least as a result of the received database query, a second database format with a database performance characteristic above a threshold performance level, the second database format being one of the plurality of different database formats, and the database performance characteristic being based at least in part on one of the different database management patterns; and processing data communicated by the received database query according to the second database format with database performance characteristics above the threshold performance level.

6. The computer-implemented method of claim 5, further comprising receiving the data communicated by the received database query to be stored according to the first database format.

7. The computer-implemented method of claim 6, wherein the determined second database format is different than the first database format.

8. The computer-implemented method of claim 7, wherein processing the data includes at least reading the data from a storage system based at least in part on the determined second database format that is different than the first database format.

9. The computer-implemented method of claim 5, wherein the second database format is determined based at least in part on a type of the received database query.

10. The computer-implemented method of claim 5, wherein the second database format is determined based at least in part on database query usage information associated with a customer associated with the data.

11. The computer-implemented method of claim 5, wherein the second database format is determined based at least in part on a heuristic built by monitoring different received database queries.

12. The computer-implemented method of claim 5, wherein the threshold performance level indicates at least one of efficiency of data reads, efficiency of data writes, efficiency of data processing, speed of data writes, speed of data reads, speed of data processing, or speed of relationship information retrieval associated with the data.

13. A system for managing database messages, comprising:

at least one memory that stores computer-executable instructions; and at least one processor configured to access the at least one memory, wherein the at least one processor is configured to execute the computer-executable instructions to collectively at least:

deploy a plurality of different structured storage engines, at least a subset of the plurality of different structured storage engines corresponding to respective storage subsystems of a plurality of different storage subsystems, at least a subset of the plurality of different storage subsystems corresponding to respective different database management characteristics;

receive customer data;

enable storage of the customer data in at least the subset of the plurality of different storage subsystems based at least in part on the respective database management characteristic;

receive a query from a customer corresponding to at least a portion of the stored customer data;

determine which storage subsystems make up the subset of the plurality of different storage subsystems based at least in part on the received query;

identify a storage subsystem containing the stored customer data for performing an instruction corresponding to the query, the identification based at least in part on data management information of the customer; and perform the instruction on the portion of the stored customer data that is stored in the identified storage subsystem.

14. The system of claim 13, wherein the subset of the plurality of different storage subsystems is determined based at least in part on a type of the received query or the data management information of the customer.

15. The system of claim 13, wherein the plurality of structured storage engines to be deployed includes a number of structured storage engines determined based at least in part on a type of the received query or the data management information of the customer.

16. The system of claim 13, wherein a performance level of at least a subset of the plurality of structured storage engines to be deployed is determined based at least in part on a type of the received query or the data management information of the customer.

17. The system of claim 13, wherein a deployment speed of at least a subset of each of the plurality of structured storage engines to be deployed is determined based at least in part on a type of the received query or the data management information of the customer.

18. One or more non-transitory computer-readable media storing computer-executable instructions for managing database messages that, when executed by one or more computer systems, configure the one or more computer systems to perform operations comprising:

managing customer data stored in a plurality of different database structures, the different database structures corresponding to different database management patterns;

receiving a first database query corresponding to a first database structure of the plurality of different database structures;

determining which database structures make up the plurality of different database structures based at least in part on database query usage information associated with a customer;

performing first database instructions on the customer data stored in at least a subset of the plurality of different database structures based at least in part on the first received database query corresponding to the first database structure of the plurality of different database structures;

monitoring performance associated with performing the first database instructions; and performing second database instructions on the customer data stored in at least a subset of the different database structures based at least in part on the monitored performance, the second database instructions corresponding to a second database structure of the plurality of different database structures.

19. The one or more non-transitory computer-readable media of claim 18, wherein the first database structure is different than the second database structure.

20. The one or more non-transitory computer-readable media of claim 18, wherein performing the second database instructions are further based at least in part on receipt of a second database query.

21. The one or more non-transitory computer-readable media of claim 20, wherein the second database instructions are performed at least in response to the second database query.

22. The one or more non-transitory computer-readable media of claim 20, wherein the instructions further configure the one or more computer systems to perform operations comprising providing a database structure recommendation based at least in part on the second database query.

23. The one or more non-transitory computer-readable media of claim 18, wherein the different database management patterns include patterns based at least in part on a relational database, a hierarchical database, an object database, a document database, a non-relational database, a network database, a graph database, or a structured query language database.

* * * * *